Nov. 28, 1939.   H. T. FAUS   2,181,803
REMOTE INDICATOR
Filed Nov. 4, 1938

Inventor:
Harold T. Faus,
by Harry E. Dunham
His Attorney.

Patented Nov. 28, 1939

2,181,803

UNITED STATES PATENT OFFICE 2,181,803

REMOTE INDICATOR

Harold T. Faus, Lynn, Mass., assignor to General Electric Company, a corporation of New York Application November 4, 1938, Serial No. 238,851

6 Claims. (Cl. 177—311)

The present application is a continuation-in-part of my application Serial No. 80,782, filed May 20, 1936, and assigned to the same assignee as the present application.

My present invention relates to remote indicating systems and concerns particularly methods and devices for indicating failure of auxiliary power sources utilized for operating remote indicating systems.

It is an object of my invention to provide reliable, inexpensive arrangements for indicating whether the telemetering system or remote indicating system is in operation, for example, for enabling an aviator to determine whether he may safely rely upon his landing gear indicator and descend to earth in confidence that his landing gear is in the proper position when the indicator is in the landing position.

Other and further objects and advantages will become apparent as the description proceeds. My invention is particularly well adapted for use in direct-current-operated position indicators and direct-current telemetric systems in which the indicator has a rotor or armature in the form of a permanent magnet and may consist of a transversely magnetized cylinder of high coercive force magnetic material. In carrying out my invention in its preferred form I arrange the indicator in such a manner that the target or index has a position in which it is concealed from view and said position is beyond the normal range of positions for indication. In addition I provide a bar magnet so oriented as to attract the rotor carrying the index to a position in which the index is concealed from view. The bar magnet is relatively weak so that its force is readily overcome by the stator field normally acting upon the rotor when the current source energizing the stator windings is acting and the system is in operation. Accordingly, as long as the operator sees the index he knows that the system is in operation and that the indication may be relied upon, but when the index disappears from view he knows that a failure of the system has taken place and that investigation is required.

Figure 1:
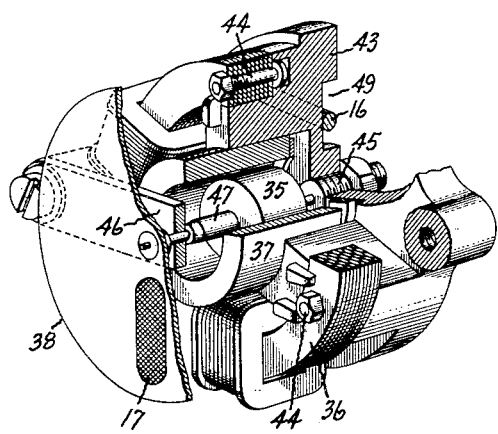
Figure 2:
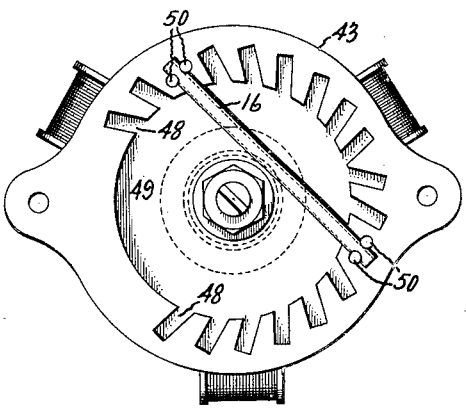
Figure 3:
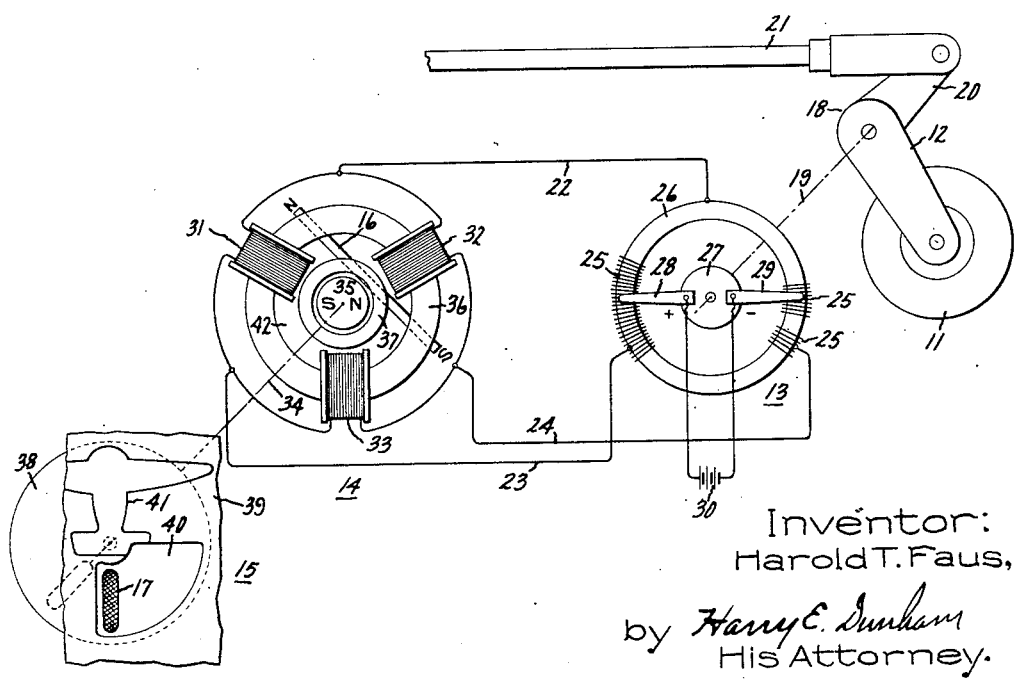

The invention may be understood more readily from the following detailed description when considered in connection with the accompanying drawing, and those features of the invention which are believed to be novel and patentable will be pointed out in the claims appended hereto. In the drawing, Fig. 1 is a perspective illustration of a telemetric receiver unit embodying my invention and having portions thereof cut away to expose the interior and to exhibit various sections taken through the structure. Fig. 2 is a back view of the arrangement illustrated in Fig. 1, and Fig. 3 is a schematic diagram of a remote indicating system for use with the landing gear of an airplane, and including a schematic representation of a front view of the unit illustrated in Fig. 1. Like reference characters are utilized throughout the drawing to designate like parts.

For the sake of illustration my invention is described by explaining the manner in which it may be used for reliably indicating the position of landing gear in an airplane. In Fig. 3 there are represented one of the landing wheels 11 of an airplane, the wheel being carried by a pivoted arm 12, a transmitter 13 for a remote indicating system mechanically connected to the pivoted arm 12, a receiver unit 14 for the remote indicating system electrically connected to the transmitter 13, and a dial or indicating portion 15 of the receiver 14. In connection with the receiver 14 there is a power-failure-indicating arrangement including a bar magnet 16 for preventing the indicator 15 from giving an indication by concealing the index 17 whenever the source of current energizing the telemetric system 13—14 fails, so that the aviator will know that his remote indicating system must be restored to operation before it may be relied upon.

It will be understood that airplanes ordinarily have a plurality of landing wheels, usually three, each carried by a retractable landing gear. However, since my invention does not relate to the landing gear itself, but merely to the remote indicating system for indicating the position of the landing gear, I have represented the landing gear only schematically by showing one of the landing wheels which is retractable, carried by the arm 12 of a bell crank 18 mounted to pivot about the axis represented by the dashed line 19. The bell crank 18 includes a second arm 20 to which is attached a bar 21 for pushing the landing wheel 11 down to the landing position in which it is shown or for retracting it, as the case may be. It will be understood that any suitable mechanism not constituting a part of my invention, such as hand levers, racks, pistons, and the like, may be utilized for operating the bar 21.

The transmitter 13 may be of the type described more in detail in my parent application, Serial No. 80,782, consisting of means for varying the relative distribution of the direct current transmitted through three or more conductors 22, 23, and 24 in accordance with the angular position of the arm 12, the position of which is to be remotely indicated. The transmitter illustrated consists of a resistor 25, only portions of which are shown for the sake of simplicity, toroidally wound upon a ring or annular form 26, and a rotatable member 27 having a pair of brushes 28 and 29 to which is connected a source of current 30, preferably a source of direct current. The rotatable member 27, which is of course insulated from the brushes 28 and 29, is mechanically connected to the arm 12 of the landing gear in any suitable manner so that it rotates in unison therewith.

The telemeter receiver unit 14 may also be of the type described more in detail in my aforesaid parent application consisting of a plurality of current conducting coils 31, 32, and 33 arranged tangentially around a mechanical center or axis represented by the dashed line 34 and a rotor 35 mounted rotatably about the axis 34. For the sake of obtaining the maximum available torque the coils 31, 32, and 33, constituting the field or stator winding of the receiver 14, are preferably interlinked with a ring or annulus 36 which may be of a laminated construction made up of a plurality of flat rings, as shown in Fig. 1, and composed of relatively permeable magnetic material, such as soft iron or suitable alloys known to those skilled in the art. The rotor 35 is preferably in the form of a transversely magnetized cylinder of high coercive force permanent magnet material, for example, sintered oxide material composed of sintered magnetite, ferric oxide and cobaltic oxide, substantially in the portion of 40.6, 30.1, and 26.3 respectively. For damping out oscillations of the rotor 35 a damping ring 37 composed of current conducting material, such as copper, for example, may be employed. Permanent magnets composed of the sintered oxide material are characterized by having very definite pole portions. If permanent magnet material were not used for the rotor and the stator flux were relied upon for magnetizing the rotor, a special configuration such as diametric elongation would be necessary for obtaining definite pole portions on the rotor, and practically no damping would be obtained owing to absence of rotor m. m. f.

The indicating mechanism 15 in the form of the receiver illustrated includes a rotatable disk 38 mechanically attached to the rotor 35, preferably on the same shaft, and having marked thereon a suitable index 17, and a stationary plate 39 having a sector-shaped opening 40 therein exposing the index 17 throughout a ninety-degree range of variations in position, but allowing the index 17 to be concealed from view when the rotor 35 rotates beyond the ninety-degree range of positions designated. In the form of indicator for the receiver illustrated in the drawing, the target 17 takes the form of the representation of an edge view of an airplane landing wheel, and the stationary plate 39 may have traced thereon the outline representation 41 of an air plane so that the position of the representation of the landing wheel 17 in relation to the representation 41 of the airplane indicates whether the tail landing wheel 11 represented by the index 17 is in a flying position or in a landing position. The pictorial design of the representations 17 and 41 may, if desired, be as shown in the copending design patent application, Serial No. D—74,846, filed February 3, 1938, by Edward G. Haven, and assigned to the same assignee as the present application.

The receiver unit 14, as previously mentioned, includes an arrangement for indicating whether or not the remote indicating system is in operation by showing whether or not the current source 30 is acting. This power failure indicating arrangement consists of the bar magnet 16 in combination with the transversely magnetized rotor 35. The bar magnet 16 is sufficiently weak so that its influence upon the rotor 35 is normally overcome by current flowing in the stator coils 31, 32, and 33, but in case of failure of the source 30 and the disappearance of the magnetic field due to the coils 31, 32, and 33, the magnetic attraction between the magnet 16 and the polarized portions of the rotor 35 is sufficiently great to cause the rotor 35 to tend to aline itself with the diametric line of magnetization 42 parallel to the bar magnet 16, with the north and south poles of the rotor 35 in opposite directions from the north and south poles of the bar magnet 16, of course. While I have referred to the member 16 as a bar magnet and it preferably is a permanent magnet, it will be understood, however, that my invention is not limited to this specific arrangement and the dimensions may be made such that a bar 16 or other suitably shaped piece of magnetizable material may be employed in which the magnetic poles are induced by the permanent magnet rotor 35 to react therewith in the same manner.

It will be seen from the drawing that the rotor 35 tends to follow the position of the brushes 28 and 29 of the transmitter 13 since the angular position of the brushes 28 and 29 determines the polarity and relative strength of the currents flowing in the conductors 22, 23, and 24 and consequently in the coils 31, 32, and 33, which in turn produces a resultant magnetic field passing across the ring 36 and passing along a diameter of the ring 36, the angular direction of which diameter depends upon the polarity and the relative strength of the current in the coils 31, 32, and 33. Coils 31, 32, and 33 are so connected that currents passing through them in series tend to produce magnetic flux traveling circularly through the ring core 36, but currents passing through any two coils in parallel tend to produce fluxes acting in opposition. With the brushes 28 and 29 in the horizontal position shown, it will be seen that the voltage drops in the resistor 25 will be such that current tends to flow through the coil 33 in such a direction as to cause flux to circulate through the ring core 36 in one given direction, and current tends to flow through the coils 31 and 32 in such a direction as to produce flux which tends to flow through the ring core 36 in the opposite direction with respect to the ring core, so that the two fluxes combine and pass across a horizontal diameter of the ring 36, thus bringing the north and south pole portions of the rotor 35 into the position shown. If the bar 21 of the landing gear has moved to the left so as to rotate the bell crank ninety degrees counterclockwise, the brushes 28 and 29 will likewise be rotated ninety degrees so as to vary the current relationships and to cause the rotor 35 to rotate ninety degrees counterclockwise, bringing the index 17 to the other end of the quadrantal opening 40.

In case the current source 30 should fail or become disconnected so that the index 17 might tend to float in any position in which it had previously been regardless of the position of the bell crank 18 of the landing gear, the magnet 16 would take control of the rotor position and rotate the rotor 35 and the index 17 to a position approximately forty-five degrees counterclockwise, in the case illustrated, beyond the position shown, so that the index 17 would be concealed from view behind the plate 39 as designated by dotted lines and the aviator would not be misled by a false indication due to failure of the auxiliary power source.

In the specific structure illustrated in Figs. 1 and 2, a base 43 is provided for supporting the parts of the telemetric receiver unit. The base 43 may be die-cast, for example, from suitable non-magnetic material such as an aluminum alloy. It is so shaped that the rings constituting the stator core 36 may be bolted to it by bolts 44 and the damping ring 37 may be pressed in. A threaded bearing support 45 may be provided at the back of the base 43 and a cross piece 46 having an opening serving as a front bearing may be secured across the front of the base 43. A spindle 47 rotatable in the said front and back bearings may be provided carrying the rotor 35 and the indicating disk 38. For supporting the power failure indication producing member or magnet 16 in any one of a number of angular positions, a plurality of slots 48 may be cut into the base 43 from its back surface, and the central portion of the back surface of the base 44 may be recessed to form the annular area 49. The slots 48 are arranged at the ends of a plurality of different chords of a circle concentric with the spindle 47 and the ring core 36. The bar magnet 16 may be secured in any one of the pairs of slots 48 by swaging, as shown at 50, or in any other desirable manner. The angular mounting position of the bar 16 may readily be changed by bending back the swaged material 50 and placing the bar 16 in a different pair of slots in case it should be desired to utilize the receiver unit 14 with a different face plate from that illustrated at 39, or, in case it should be desired to use the receiver unit for a different purpose from that illustrated in the drawing.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. A receiver for a telemetering system energized by a source of current, comprising a pair of relatively rotatable elements, one of which carries an index and the other of which includes a face plate adapted to conceal said index in certain positions but to leave it exposed throughout the normal indicating range of the receiver, one of said elements comprising a permanently magnetized magnetic member with diametrically opposite pole portions, and the other of said elements comprising a power-failure indicator magnet and current-conducting coil means adapted to be energized for producing a diametric magnetic field varying in relative angular direction in response to variation in the indication to be transmitted through the telemetric system for normally controlling the angular position of said magnetic member, said power-failure indicator magnet being mounted with poles arranged at the ends of a chord of a circle concentric with said elements, said chord being parallel to a line through the pole portions of said relatively rotatable magnetic member when the latter is in such a position that the index is concealed for indicating lack of energization of said current-conducting coil means.

2. A receiver for a telemetering system energized by a source of current, comprising a pair of relatively rotatable elements, one of said elements comprising a magnetic member with diametrically opposite definite pole portions and the other of said elements comprising a magnet for controlling the magnetic member under abnormal conditions and current-conducting coil means of such strength, when energized, as to overcome the effect of said magnet, for normally producing a diametric magnetic field varying in relative angular direction in response to variation in the indication to be transmitted through the telemetric system and controlling the magnetic member, said magnet being mounted adjustably with poles arranged at the ends of one of the chords of a circle concentric with said elements, the angular position of said chord being adjustable for adjusting the relative position which said relatively rotatable elements assume when the source energizing said current-conducting coil means fails.

3. A receiver for a telemetering system energized by a source of current, comprising a pair of relatively rotatable elements with an abnormal relative position indicative of failure of the current source, one of said elements comprising a magnetic member with diametrically opposite definite pole portions and the other of said elements comprising a power-failure-indicator magnet and current-conducting coil means adapted to be energized for producing a diametric magnetic field varying in relative angular direction in response to variation in the indication to be transmitted through the telemetric system, said power-failure-indicator magnet being mounted with poles arranged at the ends of a chord of a circle concentric with said elements, said chord being parallel to a line through said pole portions of said relatively rotatable magnetic member when the latter is in the relative position indicative of failure of the current source.

4. A receiver for a telemetering system energized by a source of current, comprising a pair of relatively rotatable elements, one of which carries an index and the other of which includes a face plate adapted to conceal said index in certain positions but to leave it exposed throughout the normal indicating range of the receiver, one of said elements comprising a magnetic member with diametrically opposite definite pole portions and the other of said elements comprising a power-failure-indicator magnet to control said magnetic member under abnormal conditions and current-conducting coil means for producing, when energized, a diametric magnetic field varying in relative angular direction in response to variation in the indication to be transmitted through the telemetric system to control the angular position of said magnetic member under normal conditions, said magnet being mounted with a pole portion eccentric with respect to said elements, the angular position thereof being such that the pole portions of said magnetic member are along a line of flux produced by said magnet when the rotatable magnet member is in a position in which the index is concealed for indicating lack of energization of said current-conducting coil means.

5. A telemetric system comprising a source of current, a plurality of conductors energized thereby, means for varying the current relationships in said conductors in response to variation in the indication to be transmitted through the telemetric system and a receiver connected to said conductors, said receiver comprising a pair of relatively rotatable elements, one of which carries an index and the other of which includes a face plate adapted to conceal said index in certain positions representing failure of current source but to leave it exposed throughout the normal indicating range of the receiver, one of said elements comprising a magnetic member with diametrically opposite definite pole portions and the other of said elements comprising a power-failure-indicator magnet for controlling the magnetic member when the current source fails and current-conducting coil means connected to said conductors and adapted, when energized, to produce a diametric magnetic field varying in angular direction in response to the relationship between the current in said conductors, said power-failure-indicator magnet being mounted with a pole eccentric to the elements of said receiver, the angular position of said magnet being such that the pole portions of said magnetic member are along a line including a line of flux of said magnet when the magnetic member is in a relative angular position in which the index is concealed for indicating lack of energization of said current-conducting coil means.

6. A receiver for a telemetering system energized by a source of current, comprising a pair of relatively rotatable elements, with an abnormal relative angular position indicative of failure of the current source, one of said elements comprising a permanently magnetized magnetic member with diametrically opposite pole portions and the other of said elements comprising a bar of magnetic material with pole portions for controlling the relative angular position of said relatively rotatable magnetic member under conditions of current failure and current-conducting coil means for producing, when energized, a diametric magnetic field varying in relative angular direction in response to variations in the indication to be transmitted through the system to control the relative angular position of the said magnetic member under normal conditions, said bar of magnetic material being mounted eccentrically with respect to said elements, the angular position thereof being such that the pole portions of said bar of magnetic material and said relatively rotatable magnetic member lie along common lines of flux when the magnetic member is in the relative angular position indicative of failure of the current source.

HAROLD T. FAUS.